United States Patent
Shimosaka

[19]

[11] Patent Number: 6,028,934
[45] Date of Patent: Feb. 22, 2000

[54] TD MULTIPLEXING DIGITAL VIDEO SIGNALS WITH SCRAMBLE OF SCRAMBLING STAGES MORE THAN ONE GREATER IN NUMBER THAN THE VIDEO SIGNALS

[75] Inventor: Naoki Shimosaka, Tokyo, Japan

[73] Assignee: NEC Corporation, Tokyo, Japan

[21] Appl. No.: 08/826,683

[22] Filed: Apr. 7, 1997

[30] Foreign Application Priority Data

Apr. 5, 1996 [JP] Japan ..................... 8-83556

[51] Int. Cl.[7] ................ H04N 7/167; H04K 1/02; H04L 9/00
[52] U.S. Cl. ................. 380/10; 380/9; 380/50
[58] Field of Search .................. 380/9, 10, 50

[56] References Cited

U.S. PATENT DOCUMENTS

| | | | |
|---|---|---|---|
| 4,807,290 | 2/1989 | Pospischil | 380/43 |
| 5,185,799 | 2/1993 | McNesby et al. | 380/28 |
| 5,355,415 | 10/1994 | Lee et al. | 380/50 |
| 5,574,717 | 11/1996 | Tomizawa et al. | 370/13 |

FOREIGN PATENT DOCUMENTS 5-268581  10/1993  Japan .

OTHER PUBLICATIONS

Kajitani et al., "Video signal distribution system for broadcasting station utilizing photonic wavelength–division and time–division hybrid multiplexed network", Opto–Electronics Res., pp. 39–46, Mar. 15, 1991.

Choi, "Parallel scrambling techniques for digital multiplexers", AT&T Technical Journal, pp. 123–136.

*Primary Examiner*—Stephen C. Buczinski
*Attorney, Agent, or Firm*—Foley & Lardner

[57] ABSTRACT

For supply to a time division multiplexer for multiplexing a predetermined number of digital multiplexer input signals bit by bit into a multiplexed signal in which a long pathological pattern is suppressed and which is supplied preferably to an optical network. A parallel scrambler subjects a plurality of digital video signals to scrambling of a prescribed number of scrambling stages with the prescribed number selected greater than the predetermined number. Produced by the scrambler, scrambled signals, equal in number to the digital video signals, are used in the digital multiplexer input signals preferably with an inverter used to invert one of the scrambled signals so that the predetermined number is equal to one plus the plurality.

18 Claims, 5 Drawing Sheets

TD MULTIPLEXING DIGITAL VIDEO SIGNALS WITH SCRAMBLE OF SCRAMBLING STAGES MORE THAN ONE GREATER IN NUMBER THAN THE VIDEO SIGNALS

BACKGROUND OF THE INVENTION

This invention relates to time division (TD) multiplexing of a plurality of digital video signals for transmission through a digital communication network. In particular, the digital communication network is an optical network between studios of a television broadcasting station.

Use of the optical network is discussed in an article written by T. Kajitani and two others and published 1991 in Japanese in the Transactions of Optical Communication System Study Group, No. OCS 90-65, of the Institute of Electronics and Information Communication Engineers of Japan, pages 39 to 64, under the title of "Video Signal Distribution System for Broadcasting Stations Utilizing Photonic Wavelength-division and Time-division Hybrid Multiplexed Network" as translated by the authors into English. The authors include the present inventor as a first one of the two others.

A multiplexing system for such video signals is disclosed in Japanese Patent Prepublication (A) No. 268,581 of 1993. In the multiplexing system, each video signal is first scrambled into a scrambled signal comprising, in each channel, frame bit positions where a frame pattern and a channel identification code should be inserted. At the frame bit positions of one of a plurality of channels, actually overwritten are the frame pattern and the identification code indicative of the channel under consideration.

Such scrambling of a plurality of digital bit streams was already discussed in an article contributed by Doowhan Choi to the AT&T Technical Journal, Volume 65 (1986), Issue 5 (September/October), pages 123 to 136, under the title of "Parallel Scrambling Techniques for Digital Multiplexers". Scramblers are exemplified, which have a prescribed number of scrambling stages greater than the number of the digital bit streams. Furthermore, this article deals with scramblers where the prescribed number is equal to or less than the number of digital bit streams.

In connection with the foregoing, it is possible to understand as will later be described in greater detail that a conventional time division multiplexing system for a preselected number of input digital video signals comprises a time division multiplexer for time division multiplexing the video signals bit by bit into a multiplexed signal. Each video signal has a tributary transmission rate between about 150 and 300 Mb/s. The multiplexed signal has a multiplexed transmission rate between about 1 and 3 Gb/s. The multiplexed signal is therefore transmitted through an optical network as well as the input digital video signals in the manner described at the outset.

When produced by the conventional time division multiplexing system, the multiplexed signal may comprise, as a long-continued pathological pattern, a very long succession of a common bit polarity, such as consecutive zeros or ones. The long pathological pattern results in a fear of occurrence of transmission errors. Such undesirable phenomena become severe when each video signal is a digital serial video signal in which a considerably long continuation of zero or one bits frequently appears. The long continuation is, for example, either alternate successions of twenty one bits and twenty zero bits or a succession of two ones followed by nineteen zeros. A maximum bit length of about seventy bits of such a same polarity is therefore allowed in the multiplexed signal for transmission through the optical network in order to reduce transmission errors.

SUMMARY OF THE INVENTION

It is consequently an object of the present invention to provide a multiplexing method of time division multiplexing a plurality of digital video signals into a multiplexed signal in which a succession of bits of a same polarity would not continue longer than seventy bits.

It is another object of this invention to provide a multiplexing method of the type described to produce the multiplexed signal which can stably be transmitted through an optical network.

It is still another object of this invention to provide a multiplexing method of the type to produce the multiplexed signal which can be transmitted through the optical network with little transmission errors.

It is a subordinate object of this invention to provide a multiplexing method which is of the type described and in which it is unnecessary to use in the multiplexed signal a code indicative of each frame.

It is a further object of this invention to provide a multiplexing device which is for time division multiplexing a plurality of digital video signals into a multiplexed signal according to a multiplexing method of the type described.

Other objects of this invention will become clear as the description proceeds.

In accordance with an aspect of this invention, there is provided a method of time division multiplexing a plurality of digital video signals into a multiplexed signal, comprising the step of time division multiplexing a predetermined number of digital input signals bit by bit into the multiplexed signal, wherein the method further comprises the steps of (A) subjecting the digital video signals to parallel scrambling of a prescribed number of scrambling stages to produce scrambled signals, equal in number to the digital video signals, the prescribed number being greater than the predetermined number, and (B) using the scrambled signals in the digital input signals.

In accordance with a different aspect of this invention, there is provided a multiplexing device for time division multiplexing a plurality of digital video signals into a multiplexed signal, comprising a time division multiplexer for multiplexing a predetermined number of digital multiplexer input signals bit by bit into the multiplexed signal, wherein the multiplexing device further comprises (A) a parallel scrambler for subjecting the digital video signals to parallel scrambling of a prescribed number of scrambling stages to produce scrambled signals, equal in number to the digital video signals, the prescribed number being greater than the predetermined number, and (B) supply means for supplying the scrambled signals to the time division multiplexer in the digital multiplexer input signals.

DESCRIPTION OF THE PREFERRED EMBODIMENT

Figure 1:
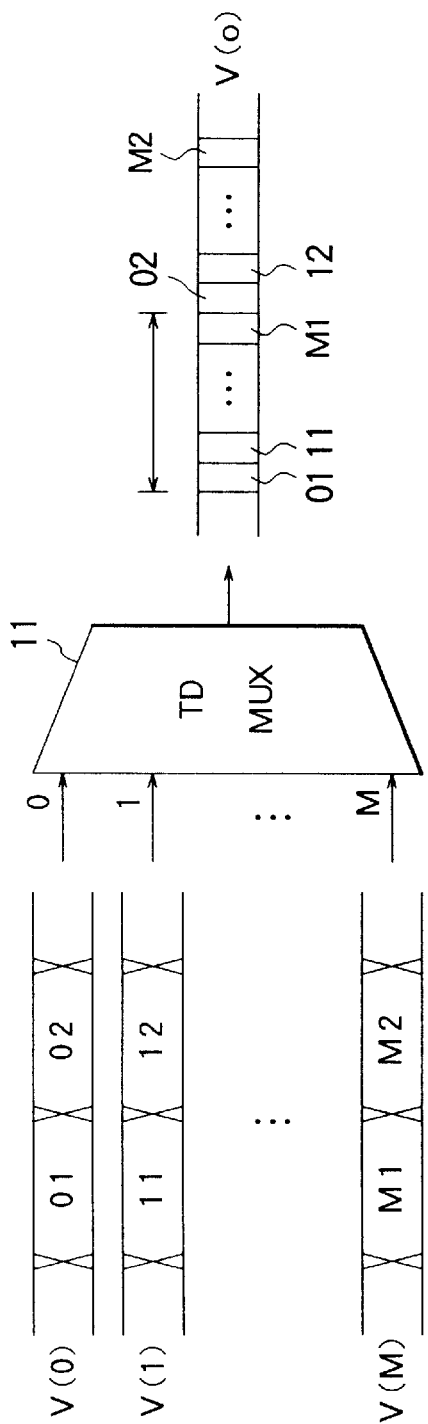
FIG. 1 is a block diagram of a conventional time division multiplexer.

Referring to FIG. 1, a conventional time division multiplexer will first be described in order to facilitate an understanding of the present invention. The conventional time division multiplexer is used, for example, in a wavelength-division and time-division hybrid multiplexer described in the Kajitani et al article referred to hereinabove in time division multiplexing first to Nt-th wavelength divided signals.

In FIG. 1, the time division multiplexer is depicted at 11 as TD MUX. Zeroth to M-th digital input signal V(0) to V(M) are supplied to the time division multiplexer 11, where M represents a preselected integer. Each of the digital input signals is a digital video signal of a tributary transmission rate between about 150 and 300 Mb/s. An m-th digital input signal is a sequence or stream of first m-ary, second m-ary, and other m-ary bits m1, m2, and so forth, where m is variable between zero and the preselected integer M.

Bit by bit multiplexing the digital input signals, the time division multiplexer 11 produces a multiplexed signal as an output multiplexed signal V(o) of a multiplexed transmission rate between about 1 and 3 Gb/s. In the output multiplexed signal, each frame is indicated by an arrow-headed horizontal line over a first frame consisting of 01-th to M1-th bits.

In the manner pointed out heretobefore, the output multiplexed signal frequency comprises a long-continued pathological pattern. By way of example, attention will be directed to an NTSC composite digital serial video signal of a bit rate of 143.1818 Mb/s according to SMPTE 259M. When sixteen streams of the digital video signals are time division multiplexed, the output multiplexed signal has the multiplexed transmission rate of 2.29 Gb/s. If the sixteen streams are supplied to the time division multiplexer 11 with a common phase and if each stream has a twenty-bit pathological pattern, the output multiplexed signal comprises as long a succession of a common bit polarity, namely, either zero bits or one bits, as 320 bits.

This long pathological pattern would give rise to transmission errors when the output multiplexed signal is transmitted through an optical network. In this connection, it may be mentioned here that the optical network includes a high frequency amplifier and that the output multiplexed signal is transmitted through the optical network with its DC or lower frequency components usually suppressed and with the use of AC coupling in order to keep the high frequency amplifier in stable operation. When the frequently long pathological pattern continues to result in a considerably conspicuous lower frequency component, the output multiplexed signal would be misjudged by a decision circuit on an output side of the optical network. A maximum run length for conventional optical receiver is therefore restricted to about seventy bits.

Figure 2:
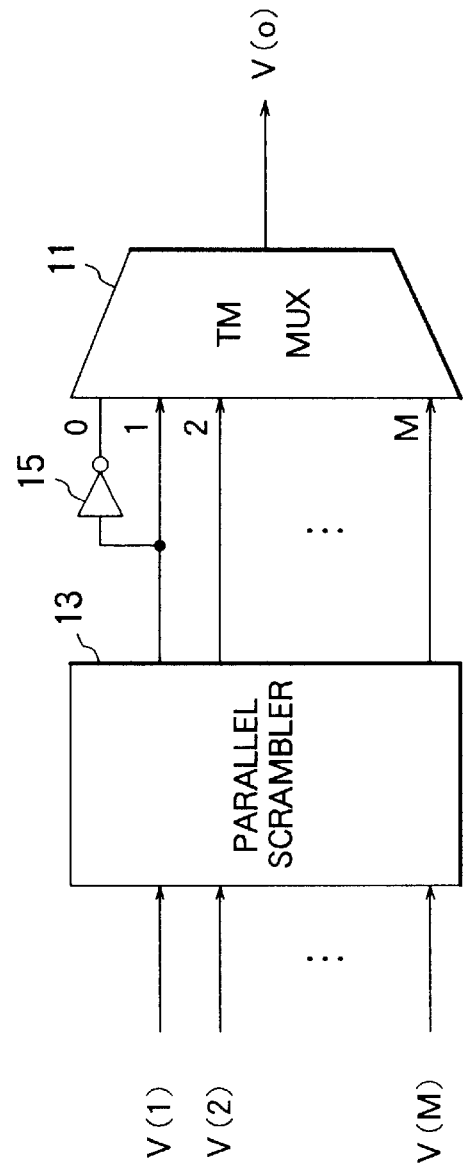
FIG. 2 is a block diagram of a time division multiplexing device according to an embodiment of the instant invention.

Referring now to FIG. 2, the description will proceed to a time division multiplexing device according to a preferred embodiment of this invention. The time division multiplexing device comprises, like in FIG. 1, the time division multiplexer 11 responsive to the zeroth to the M-th digital input signals for producing the output multiplexed signal V(o).

The zeroth to the M-th digital input signals are, however, not the digital video signals as they are. The time division multiplexer 11 is therefore depicted to have zeroth to M-th multiplexer input terminals 0 to M. The time division multiplexing device is for time division multiplexing first to M-th digital video signals V(1) to V(M), the preselected integer M minus one in number. Supplied to the time division multiplexing device, the digital video signals are herein said to be a predetermined number M in number.

In the time division multiplexing device, the first to the M-th digital video signals are delivered first to a parallel scrambler 13. Subjecting the first to the M-th digital video signals to parallel scrambling, the parallel scrambler 13 produces first to M-th scrambled signals.

First to M-th supply leads are used between the parallel scrambler 13 and the time division multiplexer 11 to supply the first to the M-th scrambled signals to the first to the M-th multiplexer input terminals 1 to M, respectively, as first to M-th digital multiplexer input signals. Only one of the first to the M-th scrambled signals is supplied to the zeroth multiplexer input terminal 0 through an inverter 15. In the example being illustrated, only the first scrambled signal is supplied to the inverter 15 and therefrom to the zeroth multiplexer input terminal 0 as an inverted signal. It has been confirmed that any one of the first to the M-th scrambled signals can be selected for delivery to the inverter 15 and thence to the zeroth multiplexer input terminal 0 provided that the output multiplexed signal is demultiplexed into reproductions of the first to the M-th digital video signals by a time division demultiplexing device having a corresponding structure.

Figure 3:
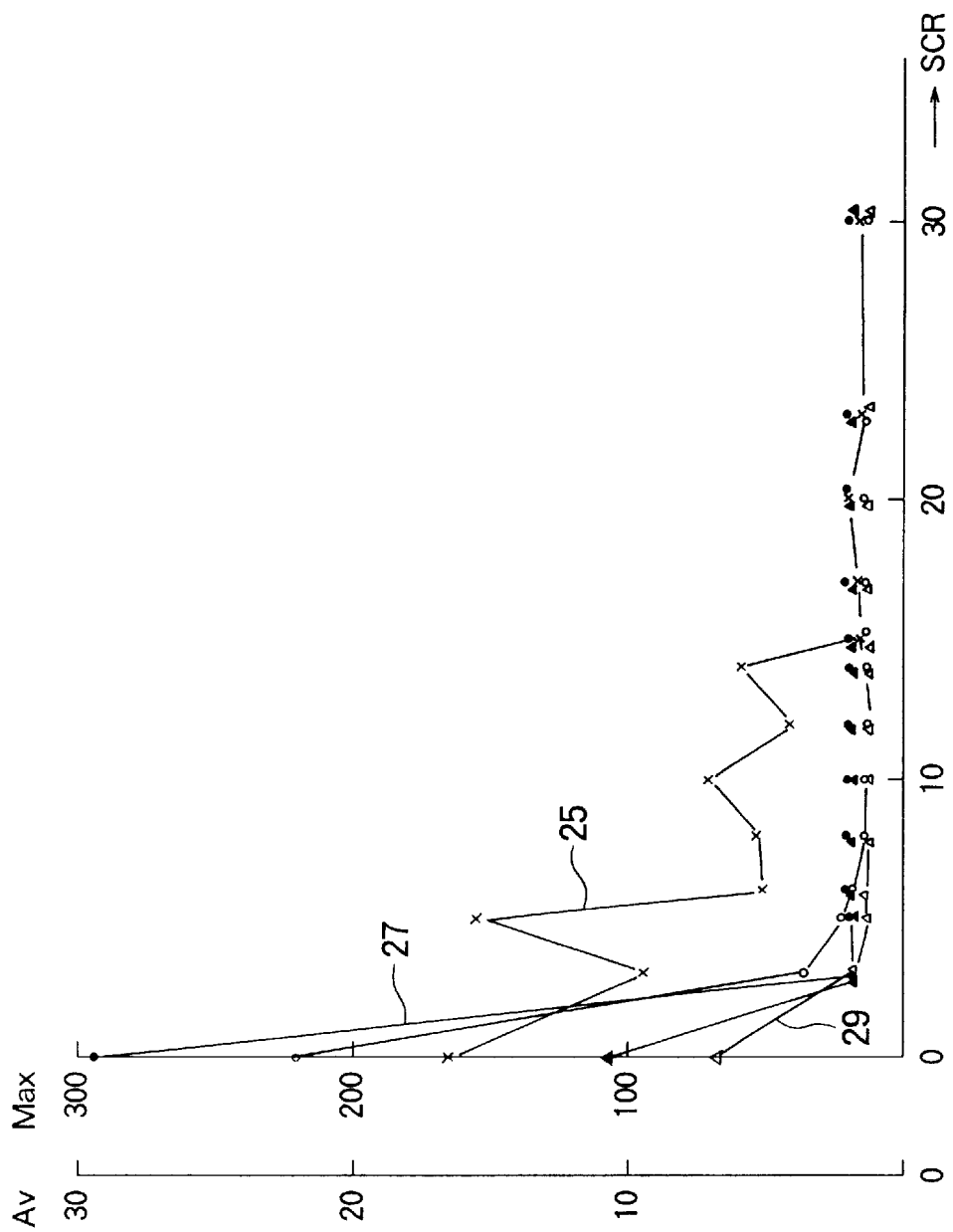
FIG. 3 is a graph illustrative of results of operation simulated in connection with a fundamental version of the multiplexing device depicted in FIG. 2.
Figure 4:
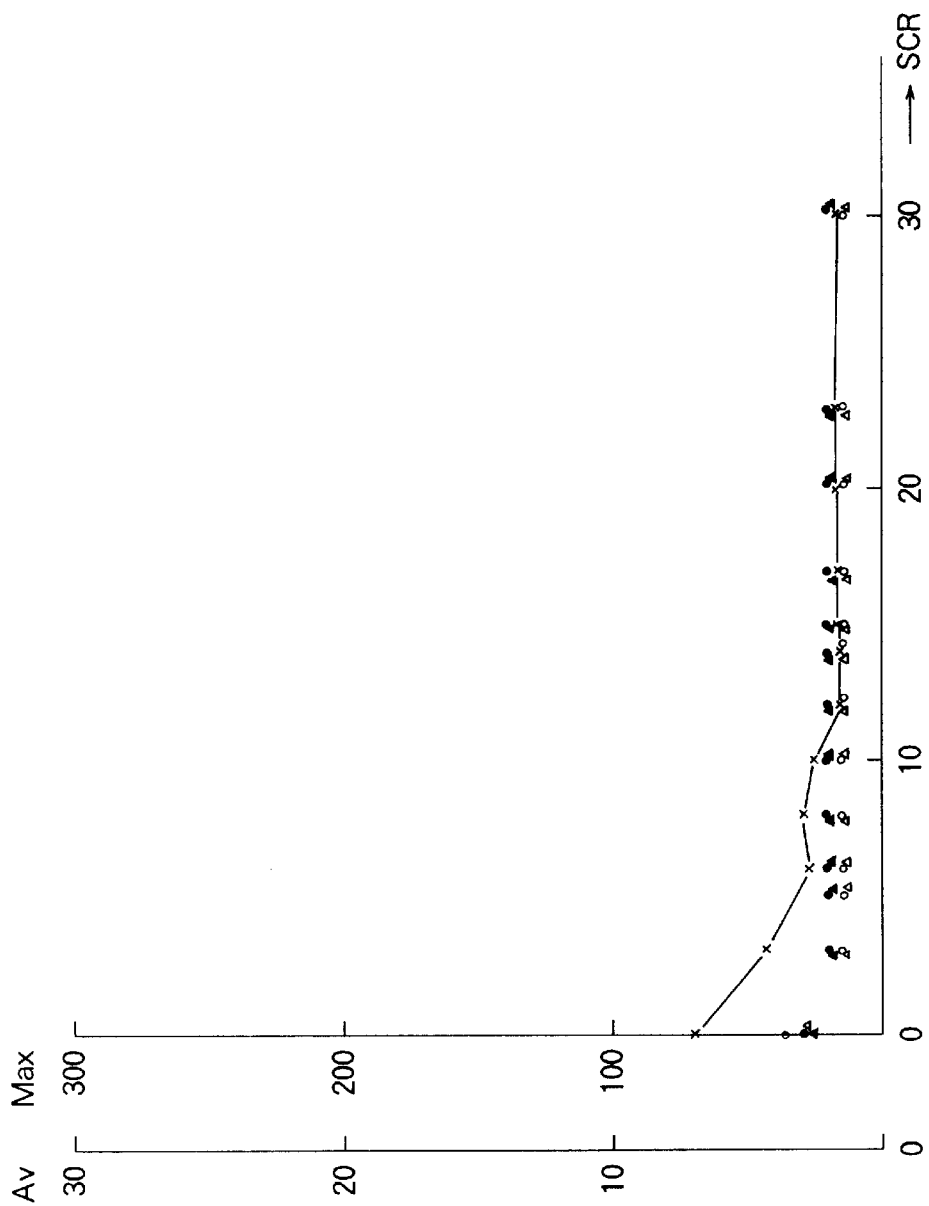
FIG. 4 is a graph illustrative of results of operation simulated in connection with a modified version of the time division multiplexing device depicted in FIG. 2.

Turning to FIGS. 3 and 4 with FIG. 2 continuously referred to, first to fifteenth digital multiplexer input signals were used as the first to the M-th digital video signals. The digital serial video signal of SMPTE 259M is presumed for each digital video signal. The parallel scrambler 11 was considered to have various numbers of scrambling stages SCR as indicated along each abscissa of FIGS. 3 and 4. Directing attention as will presently be described, to a fundamental and a modified version of the time division multiplexing device in which the time division multiplexer 11 is supplied with only first through fifteenth scrambled signals, an output multiplexed signal was simulated. In each of FIGS. 3 and 4, the ordinate represents scales of a maximum bit length Max and an average bit length Av of the pattern in the simulated output signal.

In FIG. 3, the first to the fifteenth signals are delivered in phase to the time division multiplexer 11 of the fundamental version. The maximum bit length is indicated by crosses and connected together by a polygonal line 25. The average bit length is indicated by small black circles (15MUX) connected together by another polygonal line 27 and by small black triangles (15M1C) connected together by still another polygonal line 29. In connection with the small black circles and the small black triangles, standard deviations are indicated by small white circles and small white triangles with the scale for the average bit length Av used in common.

In FIG. 4D the first to the fifteenth signals are delivered to the time division multiplexer 11 with different phases in the modified version. More particularly, the first signal is given a one-bit delay. A six-bit delay is given to the third signal. A two-bit delay is given to the sixth signal. A seven-bit delay is given to the seventh signal. A four-bit delay is given to the fourteenth signal. Ho delay is given to other signals.

The maximum bit length is indicated again by small crosses, which only are connected together by a polygonal line. The average length is indicated by small black circles (15MUX) and small black triangles (15B1C). The standard deviations are indicated by small white circles for the small black circles and by small white triangles for the small black triangles with the scale Av used in common to the average bit length as in FIG. 3.

Reviewing FIGS. 3 and 4, it is now clear that both the maximum bit length and the average bit length decrease down to a very short length when the scrambling stages exceed in number the predetermined number M. The short length is shorter than a bit length of seventy bits described before.

In view of the foregoing, the parallel scrambler 13 has in FIG. 1 a scrambling stage number greater than the number of multiplexing, namely, the number of digital video signals supplied to the time division multiplexing device. In addition, one of the first to the M-th scrambled signal is delivered to the time division multiplexer 11 with bit inversion as one of the zeroth to the M-th digital input signals, namely, as an additional bit stream in addition to the first to the M-th digital multiplexer input signals.

By this inversion, the output multiplexed signal V(o) includes bit inversion at least once in each frame. In other words, the multiplexed signal does not include consecutive ones or zeros longer than a frame length, which consists of bits, one from each of the digital video signals supplied to the time division multiplexer. Furthermore, the bit inversion occurs at a predetermined position in each frame. This makes it possible to discriminate a head of each frame in the output multiplexed signal and to use the bit inversion for establishing frame synchronization.

Referring again to FIG. 2, it is presumed that each of the digital video signals is the NTSC composite digital serial video signal according to the SMPTE 259M and has the tributary transmission rate of 143.1818 Mb/s described before. In order that the multiplexed transmission rate may not exceed 2.5 Gb/s which is a practical bit rate of the optical network, first to fifteenth NTSC component digital serial video signals are used as the first to the M-th digital video signals, namely, the plurality is set at fifteen. Taking FIGS. 3 and 4 into consideration, the scrambling stages are set at greater than sixteen in number. In order to reduce an amount of hardware of the parallel scrambler 13, a characteristic polynomial p(x) of the parallel scrambling is made to have a least number (three) of terms with a result that the scrambling stages are set at seventeen in number. More specifically, the characteristic polynomial is given as;

$$p(x)=x^{17}+x^3+1.$$

Figure 5:
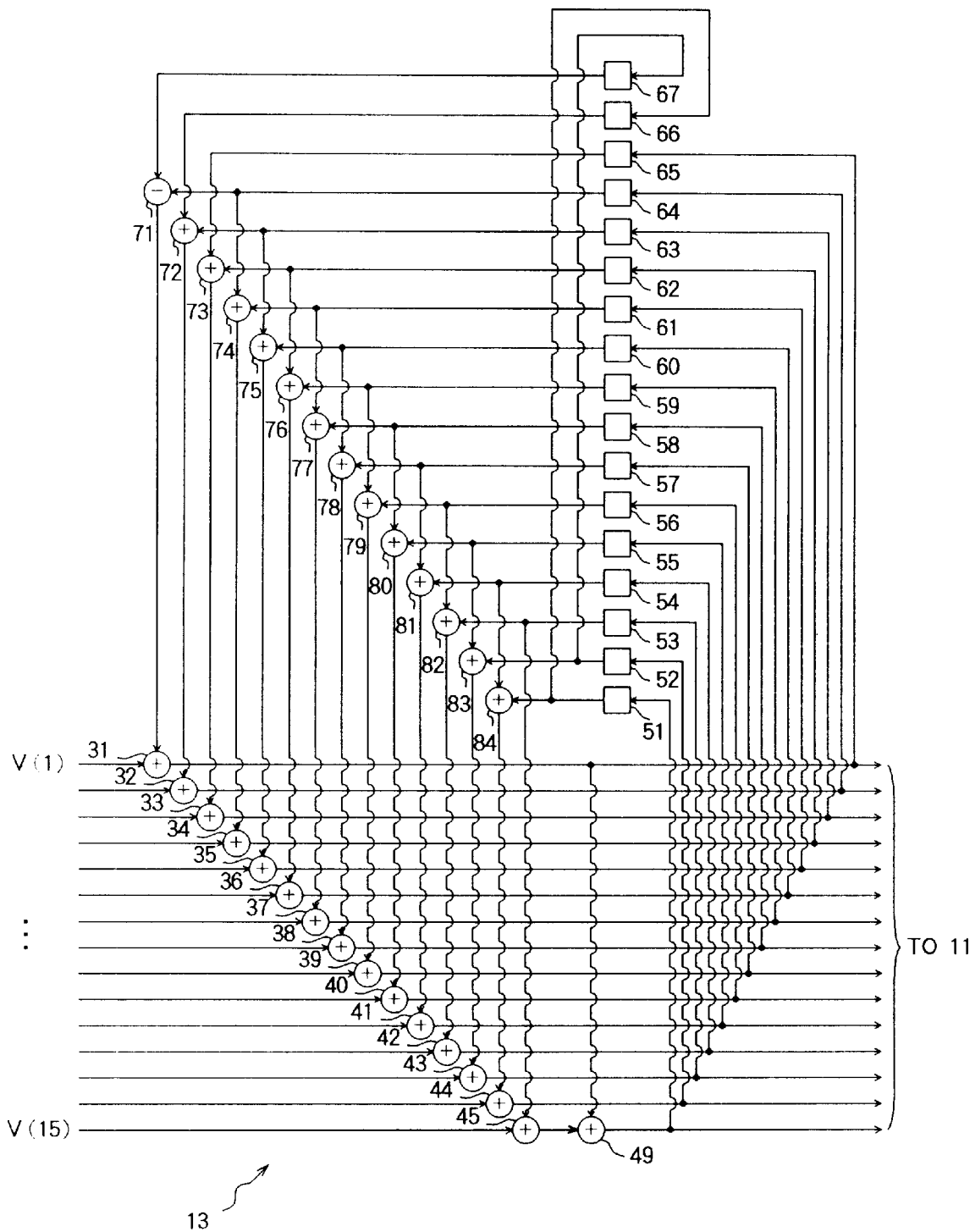
FIG. 5 is a block diagram of a parallel scrambler for use in the time division multiplexing device depicted in FIG. 2.

Turning to FIG. 5, the first to the fifteenth digital video signals are indicated by V(1) to V(15). The parallel scrambler 13 comprises first to fourteenth primary XOR (Exclusive OR) gates 31, 32, 33, 34, 35, 36, 37, 38, 39, 40, 41, 42, 43, and 44 responsive to the first to the fourteenth digital video signals, respectively, and to first to fourteenth addend signals, respectively. With the first to the fourteenth addend signals and a fifteenth addend signal produced in the manner which will presently be described, the first to the fourteenth primary XOR gates 31 to 44 produces first to fourteenth XOR signals, respectively, as the first to the fourteenth scrambled signals. Responsive to the fifteenth digital video signal and the fifteenth addend signal, a fifteenth XOR gate 45 produces a preparatory XOR signal Responsive to the preparatory XOR signal and the first XOR signal, an additional XCR gate 49 produces a fifteenth XOR signal as the fifteenth scrambled signal.

First and second D flip-flops 51 and 52 are for producing first and second flip-flop output signals in response to the fifteenth and the fourteenth XOR signals, respectively. A third D flip-flop 53 produces a third flip-flop output signal as the fifteenth addend signal in response to the thirteenth XOR signal. Fourth to fourteenth D flip-flops 54, 55, 56, 57, 58, 59, 60, 61, 62, 63, and 64 produce fourth to fourteenth flip-flop output signals in response to the twelfth to the second XOR signals, respectively. A fifteenth D flip-flop 65 produces a fifteenth flip-flop output signal in response to the first XOR signal. Sixteenth and seventeenth D flip-flops 66 and 67 produce sixteenth and seventeenth flip-flop output signals in response to the first and the second flip-flop output signals, respectively.

First to fourteenth secondary XOR gates 71, 72, 73, 74, 75, 76, 77, 78, 79, 80, 81, 82, 83, and 84 are supplied with the first to the fourteenth flip-flop output signals, respectively, and with the fourth to the seventeenth flip-flop output signals, respectively. The first to the fourteenth secondary XOR gates 71 to 84 produce the first to the fourteenth addend signals, respectively.

Turning back to FIG. 2, it is now presumed that each of the digital video signals is again the NTSC component digital serial video signal and has the tributary transmission rate of 270 Mb/s. In order that the multiplexed transmission rate may not exceed 2.5 Gb/s described above, first to seventh video signals are used as the first to the M-th digital video signals namely, the plurality is set at seven. In view of FIGS. 3 and 4, the scrambling stages are set at greater than eight. The output multiplexed signal has a multiplexed transmission rate of 2.16 Gb/s. In order to reduce the hardware in amount, the characteristic polynominal p(x) is made to have a least number (three) of terms with a result that the scrambling stages are set at eleven in number That is, the characteristic polynomial is given as:

$$p(x)=x^{11}+x^2+1.$$

Figure 6:
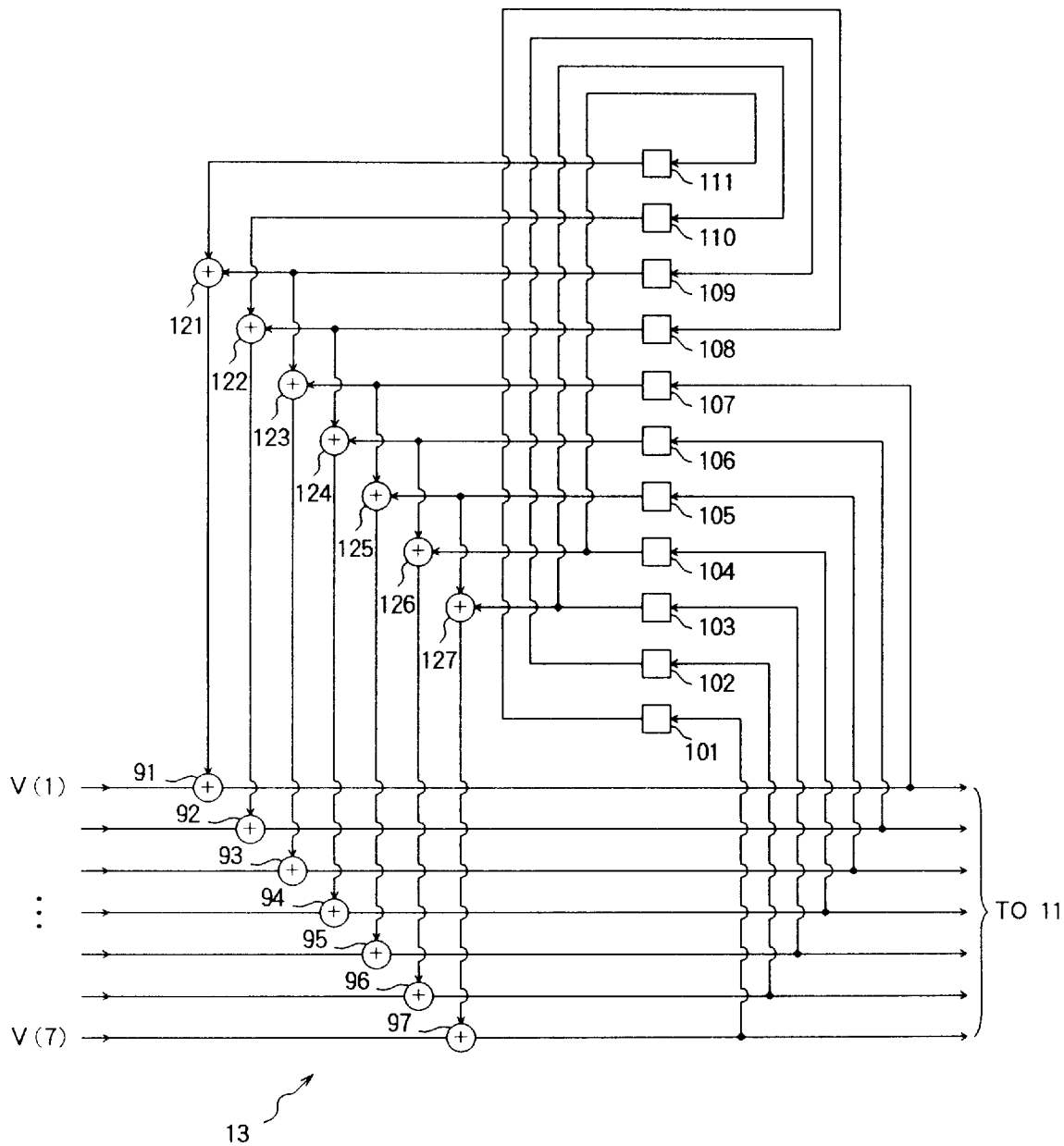
FIG. 6 is a block diagram of another parallel scrambler for use in the time division multiplexing device illustrated in FIG. 2.

Referring to FIG. 6, the first to the seventh digital video signals are indicated at V(1) to V(7). Under the circumstances, the parallel scrambler 13 comprises first to seventh primary XOR gates 92, 92, 93, 94, 95, 96, and 97 responsive to the first to the seventh digital video signals, respectively, and to first to seventh addend signals, respectively. With the first to the seventh addend signals produced in the manner which is somewhat different from the manner described above in conjunction with the first to the fifteenth addend signals and will shortly be described, the first to the seventh primary XOR gates 92 to 97 produce first to seventh XOR signals, respectively, as the first to the seventh scrambled signals.

First and second D flip-flops 101 and 102 produce first and second flip-flop output signals in response to the seventh and the sixth XOR signals, respectively. Third to seventh D flip-flops 103, 104, 105, 106, and 107 produce third to seventh flip-flop output signals in response to the fifth to the first XOR signals, respectively. In addition, eighth to eleventh D flip-flops 108, 109, 110, and 111 are supplied with the first to the fourth flip-flop output signals, respectively, to produce eighth to eleventh flip-flop output signals.

First to seventh secondary XOR gates 121, 122, 123, 124, 125, 126, and 127 are supplied with the ninth to the third flip-flop output signals, respectively. Additionally supplied with the eleventh to the fifth flip-flop output signals, respectively, the first to the seventh secondary XOR gates 121 to 127 produce the first to the seventh addend signals.

While this invention has thus far been described in specific conjunction with a sole preferred embodiments thereof, it will now be readily possible for one skilled in the art to carry this invention into effect in other various manners. For example, it is possible to select the predetermined number at two or more greater than the plurality. Even in this event, it is preferred to supply one of the first to the M-th scrambled signals to the time division multiplexer 11 with bit by bit inversion of one of such two or more signals used in addition to the scrambled signals, M in number, produced by the parallel scrambler 13.

What is claimed is:

1. A method of time division multiplexing a plurality of digital video signals into a multiplexed signal, comprising the step of time division multiplexing a predetermined number of digital input signals bit by bit into said multiplexed signal, wherein said method further comprises the steps of:

subjecting said digital video signals to parallel scrambling of a prescribed number of scrambling stages to produce scrambled signals, equal in number to said digital video signals, said prescribed number being greater than said predetermined number; and using said scrambled signals in said digital input signals;

wherein said using step uses as said digital input signals said scrambled signals and an inverted signal into which any one of said scrambled signals is bit by bit inverted.

2. A method as claimed in claim 1, wherein said using step uses said scrambled signals in said digital input signals so that said multiplexed signal includes a pathological pattern which has in each frame of said multiplexed signal a bit length of said predetermined number at maximum.

3. A method as claimed in claim 1, wherein said predetermined number is equal to one plus said plurality.

4. A method as claimed in claim 1, wherein said prescribed number is not less than one plus said predetermined number.

5. A method as claimed in claim 4, wherein:

said plurality is equal to fifteen;

said prescribed number being equal to seventeen.

6. A method as claimed in claim 4, wherein:

said plurality is equal to seven;

said prescribed number being equal to eleven.

7. A multiplexing device for time division multiplexing a plurality of digital video signals into a multiplexed signal, comprising a time division multiplexer for multiplexing a predetermined number of digital multiplexer input signals bit by bit into said multiplexed signal, wherein said multiplexing device further comprises:

a parallel scrambler for subjecting said digital video signals to parallel scrambling of a prescribed number of scrambling stages to produce scrambled signals, equal in number to said digital video signals, said prescribed number being greater than said predetermined number; and supply means for supplying said scrambled signals to said time division multiplexer in said digital multiplexer input signals;

wherein said supply means comprises:

a plurality of supply leads between said parallel scrambler and said time division multiplexer for supplying said scrambled signals to said time division multiplexer in said digital multiplexer input signals; and an inverter between any one of said supply leads and said time division multiplexer for bit by bit inverting for supplying to said time division multiplexer one of said scrambled signals that is supplied from said parallel scrambler to said time division multiplexer through said one of said supply leads.

8. A multiplexing device as claimed in claim 7, wherein said supply means supplies said scrambled signals to said time division multiplexer so that said multiplexed signal includes a pathological pattern which has in each frame of said multiplexed signal a bit length of said predetermined number at maximum.

9. A multiplexing device as claimed in claim 8, wherein said supply means supplies said scrambled signals to said time division multiplexer so that said multiplexed signal includes in each frame of said multiplexed signal at least one bit as an indication of said each frame.

10. A multiplexing device as claimed in claim 7, wherein said predetermined number is equal to one plus said plurality.

11. A multiplexing device as claimed in claim 7, wherein:

said plurality is equal to fifteen;

said prescribed number being not less than sixteen.

12. A multiplexing device as claimed in claim 11, wherein said prescribed number is equal to seventeen.

13. A multiplexing device as claimed in claim 12, wherein said parallel scrambler has a characteristic polynomial given by:

$$x^{17}+x^3+1.$$

14. A multiplexing device as claimed in claim 13, said plurality of digital video signals being first to fifteenth digital video signals, said scrambled signals being first to fifteenth scrambled signals, wherein said parallel scrambler comprises:

first to fourteenth primary XOR gates responsive to said first to said fourteenth digital video signals and first to fourteenth addend signals for producing first to fourteenth XOR signals as said first to said fourteenth scrambled signals;

a fifteenth XOR gate responsive to said fifteenth digital video signal and a fifteenth addend signal for producing a preparatory XOR signal;

an additional XOR gate responsive to said preparatory XOR signal and said first XOR signal for producing a fifteenth XOR signal as said fifteenth scrambled signal;

first and second D flip-flops responsive to said fifteenth and said fourteenth XOR signals for producing first and second flip-flop output signals;

a third D flip-flop responsive to said thirteenth XOR signal for producing a third flip-flop output signal as said fifteenth addend signal;

fourth to fourteenth D flip-flops responsive to said twelfth to said second XOR signals for producing fourth to fourteenth flip-flop output signals;

a fifteenth D flip-flop responsive to said first XOR signal for producing a fifteenth flip-flop output signal;

sixteenth and seventeenth D flip-flops responsive to said first and said second flip-flop output signals for producing sixteenth and seventeenth flip-flop output signals; and first to fourteenth secondary XOR gates responsive to said first to said fourteenth flip-flop output signals and said fourth to said seventeenth flip-flop output signals for producing said first to said fourteenth addend signals.

15. A multiplexing device as claimed in claim 7, wherein:

said plurality is equal to seven;

said prescribed number being not less than eight.

16. A multiplexing device as claimed in claim 15, wherein said prescribed number is equal to eleven.

17. A multiplexing device as claimed in claim 16, wherein said parallel scrambler has a characteristic polynomial given by:

$$x^{11}+x^2+1.$$

18. A multiplexing device as claimed in claim 17, said plurality of digital video signals being first to seventh digital video signals, said scrambled signals being first to seventh scrambled signals, wherein said parallel scrambler comprises:

first to seventh primary XCR gates responsive to said first to said seventh digital video signals and first to seventh addend signals for producing first to seventh XOR signals as said first to said seventh scrambled signals;

first and second D flip-flops responsive to said seventh and said sixth XOR signals for producing first and second flip-flop output signals;

third to seventh D flip-flops responsive to said fifth to said first XOR signals for producing third to seventh flip-flop output signals;

eighth to eleventh D flip-flops responsive to said first to said fourth flip-flop output signals for producing eighth to eleventh flip-flop output signals; and first to seventh secondary XOR gates responsive to said ninth to said third flip-flop output signals and said eleventh to said fifth flip-flop output signals for producing said first to said seventh addend signals.

* * * * *